United States
Filipovich

4,150,888
Apr. 24, 1979

[54] CLOSED LOOP AUTOMATIC FOCUSING UNIT

[75] Inventor: Danny Filipovich, Chicago, Ill.

[73] Assignee: Bell & Howell Company, Chicago, Ill.

[21] Appl. No.: 820,483

[22] Filed: Jul. 29, 1977

Related U.S. Application Data

[63] Continuation-in-part of Ser. No. 632,737, Nov. 17, 1975, abandoned.

[51] Int. Cl.$^2$ .............................................. G03B 7/08
[52] U.S. Cl. ...................................................... 354/25
[58] Field of Search ................. 352/140; 354/25, 195, 354/199; 355/56

[56] References Cited

U.S. PATENT DOCUMENTS

| | | | |
|---|---|---|---|
| 2,922,351 | 1/1960 | Hering | 354/25 |
| 3,185,059 | 5/1965 | Qurst | 354/25 |
| 3,442,193 | 5/1969 | Pagel | 354/25 |
| 3,614,921 | 10/1971 | Yamanaka et al. | 354/25 |
| 3,618,498 | 11/1971 | Eppinger | 354/199 X |
| 3,678,835 | 7/1972 | Takishima | 355/56 X |
| 3,682,071 | 8/1972 | Hosoe | 354/25 |
| 3,783,261 | 1/1974 | Hartmann | 352/140 X |
| 3,836,919 | 9/1974 | Matsumoto et al. | 354/25 |

*Primary Examiner*—Donald A. Griffin
*Attorney, Agent, or Firm*—Gary M. Ropski; Aaron Passman; Roger M. Fitz-Gerald

[57] ABSTRACT

A closed loop automatic focusing system suitable for use in a camera is disclosed which has a beam producing means producing a narrow beam of light radiation directed toward an object to be focused. Having been reflected by the object, the beam is received by an afocal objective lens group which refracts the beam in collimated form when the object is in focus and refracts the beam in divergent or convergent form when the object is not in focus. The beam is then directed to a double photocell upon which the beam impinges equally when in collimated form and unequally when in divergent or convergent form. If the double photocell senses any divergence or convergence, a servo system is directed to correct the focusing error. Alternatively, the objective lens group refracts the beam in constant divergent or convergent form when the object is in focus and non-constant divergent or convergent form when the object is not in focus.

5 Claims, 3 Drawing Figures

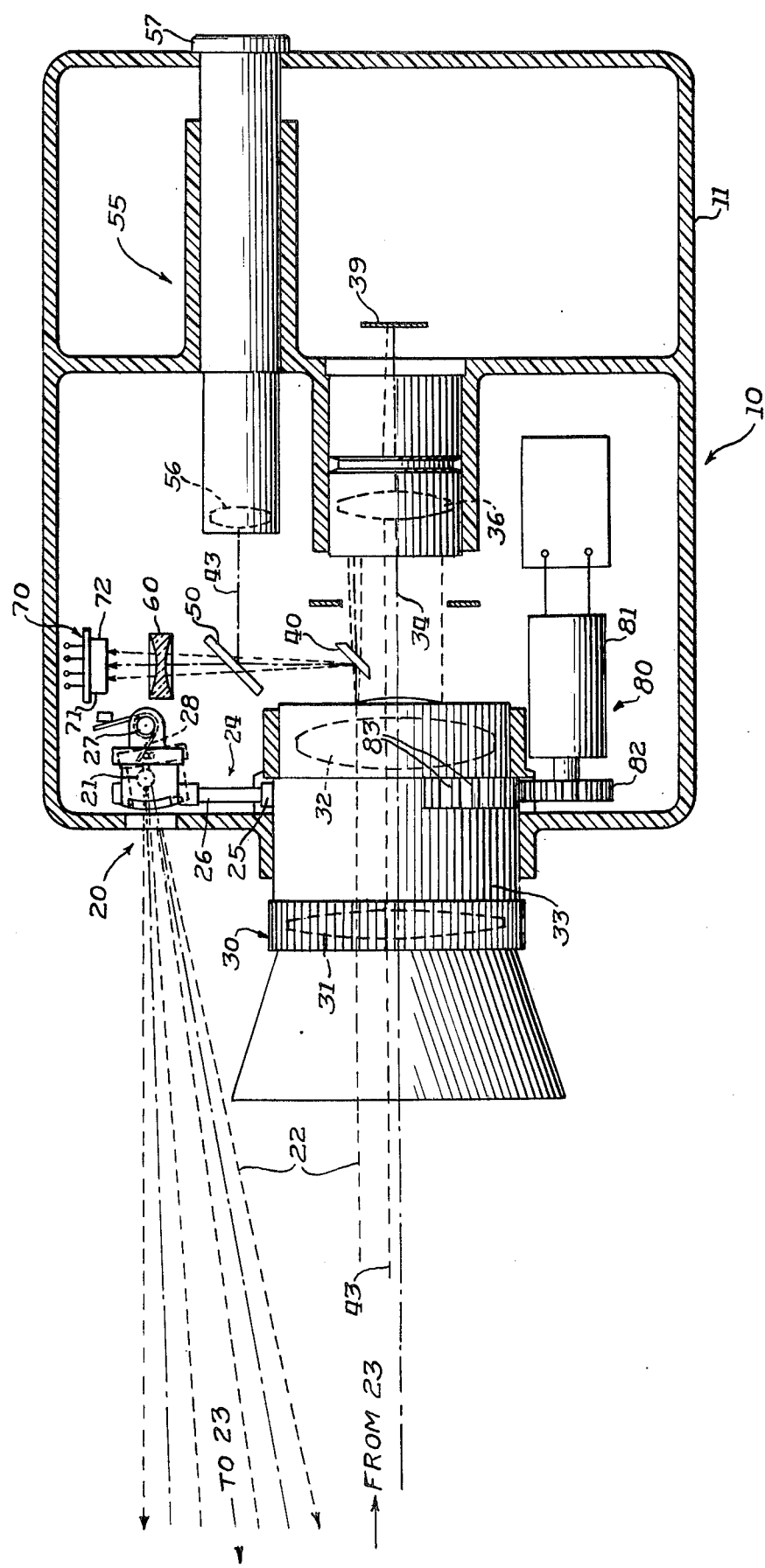

CLOSED LOOP AUTOMATIC FOCUSING UNIT

BACKGROUND AND SUMMARY OF THE INVENTION

This application is a continuation-in-part of prior pending application Ser. No. 632,737, filed Nov. 17, 1975 and now abandoned.

This invention relates to photographic apparatus and, more particularly, to an automatic focusing system. Several types of automatic focusing systems are known in the field of photographic apparatus. For example, one such automatic focusing system is disclosed in Gallagher et al. U.S. Pat. No. 4,005,442, assigned to the same assignee, wherein a range finder circuit controls pivoted motion of a reception means so as to maintain its longitudinal axis in alignment with a reflected light beam image through variations in camera-to-object distance. Furthermore, the triangulation system, as disclosed in U.S. Pat. No. 3,442,193, measures the distance between the camera and the object to be focused upon by determining the angle of a beam of light emitted from a source within the camera and the same beam of light reflected from the object to another point in the camera. This angular amount is translated into mechanical movement of the focusing lens proportional to the distance between the camera and object. Another example is the zone-type range finder system, as disclosed in U.S. Pat. No. 3,736,057. This sytem employs two spaced photo-sensitive devices having electrical parameters which respectively vary as a function of the brightness of light incident thereon reflected from the object to be focused. An emitting means projects a beam of light toward the object and upon reflection back to the photo-sensitive devices, electrical circuitry determines the range of distances in which the object is located in relation to the camera.

SUMMARY OF THE INVENTION

According to the present invention there is provided a closed loop automatic focusing system having a beam producing means producing a relatively narrow beam of light radiation directed to an object to be focused. In this particular embodiment, the frequency content of the beam is outside the visible spectrum and preferably within the infrared range. Having been reflected by the object, the beam is received by an objective or taking-lens system, which also receives visible light radiation reflected from the object for use in exposing film and manually enables the person to direct the photographic apparatus toward the object.

In this particular embodiment the taking-lens system that receives the beam has an afocal objective lens group, which has the characteristic of collimating the beam when the object is in focus and diverging or converging the beam when the object is not in focus.

An alternative taking-lens system may be utilized, which has the characteristic of refracting the beam in a predetermined constant divergent or convergent form when the object is in focus. In this alternative taking-lens system, the beam will be refracted in a non-constant divergent or convergent form when the object is not in focus. However, in the particular embodiment described herein, the taking-lens system refracts the beam in collimated form when the object is in focus and refracts the beam in a divergent or convergent form when the object is not in focus.

The beam is then reflected by a peek-in mirror, which also reflects a portion of the visible light. The reflected beam is then separated by a cold mirror from the reflected visible light, which is diverted to a viewfinder. After the transmitted beam is magnified by an error magnification lens, the transmitted beam is directed to a double photocell. The transmitted beam will impinge equally on the double photocell when the beam is in collimated form and unequally on the double photocell when the beam is in divergent or convergent form.

If the alternative taking-lens system is utilized where the beam is refracted in constant divergent or convergent form when the object is in focus, the transmitted beam will impinge equally on the double photocell when the beam is in constant divergent or convergent form. The transmitted beam will impinge unequally on the double photocell when the beam is in non-constant divergent or convergent form. If the double photocell senses an electrical imbalance, a servo system is directed to correct the focusing error by adjusting the lens system. If the double photocell senses a lack of electrical imbalance, the photographic apparatus is in force.

BRIEF DESCRIPTION OF THE DRAWINGS

FIG. 2 is an enlarged, partially cut-away side view of the photographic apparatus incorporating the present invention;

DETAILED DESCRIPTION OF THE PREFERRED EMBODIMENTS

Figure 1:
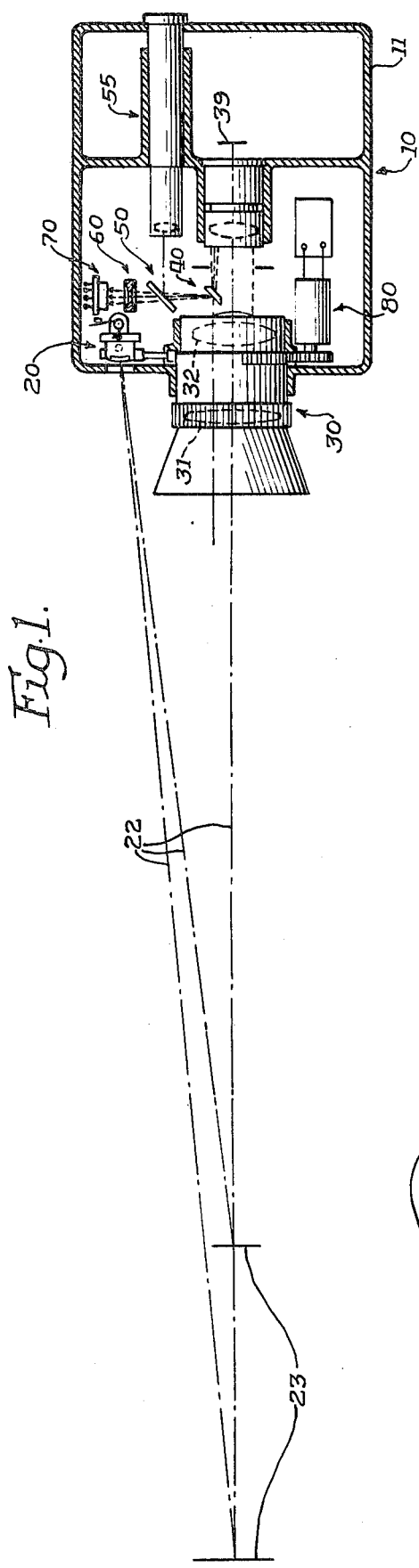
FIG. 1 is a partially cut-away side view of photographic apparatus embodying a preferred form of the present invention, a beam of light radiation and an object to be photographed.

Referring now to the drawings and particularly to FIG. 1, the photographic apparatus, such as a camera, is represented generally by reference numeral 10. A light-proof encasement 11 surrounds the elements of the camera 10. The elements of the camera 10 include a light-emitting system 20, a lens system 30, a peak-in mirror 40, a cold mirror 50, and error magnification lens 60, a photo-sensing system 70, and a servo system 80. The light-emitting system 20 in the camera 10 produces a beam of infrared radiation 22, which is directed towards an object 23 upon which the camera 10 is to be focused. Having been reflected by the object 23, the beam 22 is received and refracted by the lens system 30. The refracted beam 22 passes to and is reflected by the peek-in mirror 40 through the cold mirror 50 and the error magnification lens 60 to photo-sensing system 70. The photo-sensing system 70 detects any focusing error and directs the servo system 80 to correct any focusing error.

Referring now to FIG. 2, the light-emitting system 20 within the camera 10 has a light-emitting diode 21 adapted to produce the beam 22 directed at the object 23. The light-emitting diode 21 preferrably emits the beam 22 within a beamspread of an angle of 3 degrees or less. A beam of greater angular emission will not enable the photo-sensing system 70 to determine focusing error with desirable accuracy.

The light-emitting sysem 20 is pivotally connected to a parallax correction cam system 24, which adjusts the light-emitting system 20 to project the beam 22 centrally onto the object 23 wherever the object 23 is located within certain limits described later. The elements of parallax correction cam system 24 are a cam 25, which is rigidly connected to the perimeter of an annular barrel 33 and a cam follower 26, which rests vertically above the cam 25. As annular barrel 33 rotates in a clockwise or counterclockwise direction, the cam 25 drives the cam follower 26 in either an upward or downward vertical direction. On the upper end of the cam follower 26 rests the light-emitting system 20. The light-emitting system 20 pivots about a pivot point 27, which has a coil spring 28. The coil spring continually biases the light-emitting system 20 in a downward direction against the cam follower 26, which is shaped to define the correct pivot position of the light-emitting system 20 for parallax correction based on the particular focus position of the annular barrel 33.

The beam 22 is projected from the light-emitting diode 21 to the object 23. In the embodiment described herein, the automatic focus positioning of the camera 10 in the lens system 30 is adjustable for objects between a lower limit of about four feet and an upper limit of about twenty-five feet. Objects beyond about twenty-five feet are considered to be at virtual infinity, and the photo-sensing system 70 signals the servo system 80 to set the lens system 30 for a focusing distance of twenty-five feet.

After the beam 22 strikes the object 23, the beam 22 will be reflected back to the lens system 30. The purpose of the lens system 30 is to provide a system of lenses for focusing the object 23. In the preferred embodiment, the lens system 30 is a zoom lens system which includes a variable power afocal objective lens group and an image forming prime lens 36. A front focusing lens 31 is the first element of the afocal lens group which forms a part of the lens system 30. The afocal objective lens group further includes a rear lens 32 and other well known lens elements (not shown) as typically used in zoom lens systems. The focusing lens 31 can be moved with respect to other elements of the lens system 30 to compensate for a change in object distance which shifts the focus point of the focusing lens 31 with respect to other elements, particularly rear lens 32.

The focusing lens 31 is movable along an axis 34 which is perpendicular to the plane of the focusing lens 31. Furthermore, the focusing lens 31 is supported by the annular barrel 33, which is rigidly joined to the focusing lens 31 in a well-known manner so that upon rotation of the annular barrel 33, both the focusing lens 31 and the annular barrel 33 move along an axis 34. The axis 34 is conventionally aligned with the rear lens 32, the prime lens 36 and a photo-sensitive film plane 39 inside the camera 10.

Figure 3:
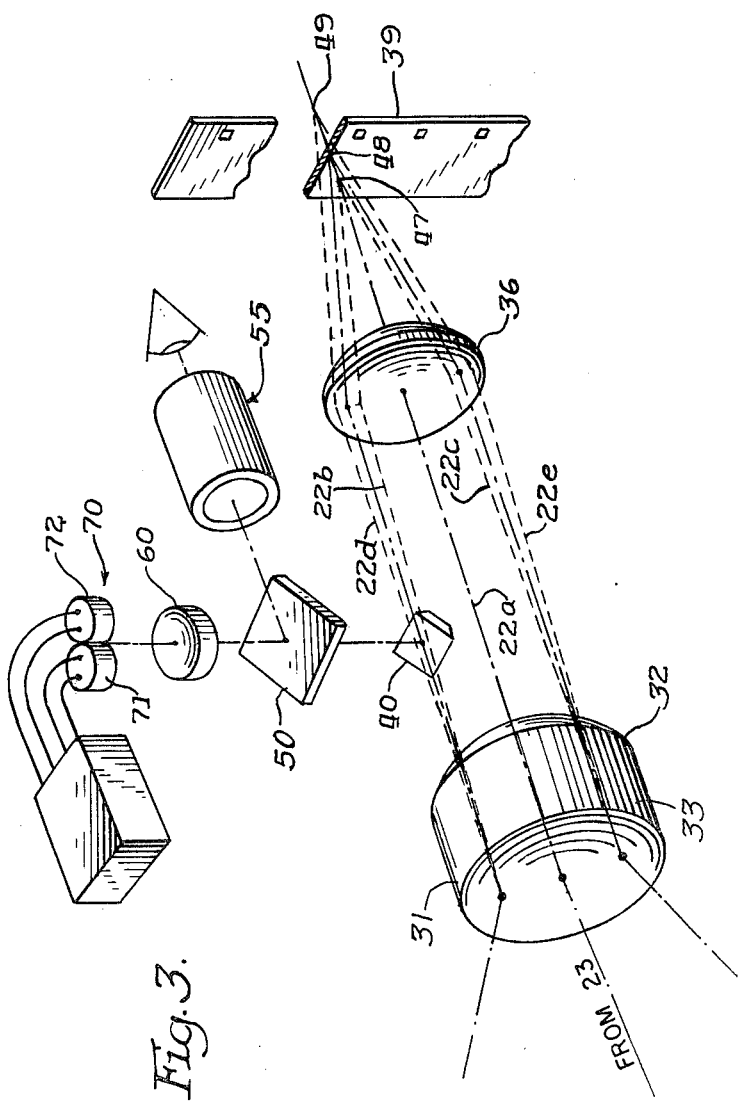
FIG. 3 is a schematic diagrammatic illustration of the reflected beam entering the photographic apparatus and being manipulated by the various components incorporating part of the present invention.

As shown best in FIG. 3, the afocal lens group comprising focusing lens 31 and rear lens 32 has the characteristic of refracting the beam 22 into a collimated form when the object 23 is in focus and into a divergent or convergent form when the object 23 is not in focus. For example, when the object 23 is in focus, the light rays 22a leave the rear lens 32 in collimated form for refraction by the prime lens 36 to meet at the proper focal point 48 on the film plane 39. When the object 23 is not in focus but rather beyond the focal point of the lens setting, the light rays 22b and 22c leave the rear lens 32 in convergent form and are refracted by the prime lens 36 to meet at a focal point 47 in front of the film plane 39. When the object 23 is not in focus and is closer than the focal plane of the lens setting, the light rays 22d and 22e leave the rear lens 32 in a divergent form and are refracted by the prime lens 36 to meet at a focal point 49 behind the film plane 39.

Referring now to FIG. 2, the peek-in mirror 40 is located between the rear lens 32 and the prime lens 36. The peek-in mirror 40 is any commonly known reflective mirror, which has the characteristic of reflecting light radiation of all frequencies. The peek-in mirror 40 is placed at a point near the axis 34 where only a small portion of the beam 22 is diverted from the path of the beam 22 between the rear lens 32 and the prime lens 36. More specifically, the peek-in mirror 40 is radially spaced from the axis 34 and is positioned at an angle of 45 degrees with respect to the optical axis 34. By such arrangement, the peek-in mirror 40 sufficiently samples the refracted visible rays 43 forming the image of object 23 on film plane 39, as well as the refracted non-visible beam 22 without, however, unduly affecting the visual image exposure on the film 39. The peek-in mirror produces a single sampled portion of the visible light rays 43 and the non-visible beam 22.

The cold mirror 50 is located substantially vertically above the peek-in mirror 40. The cold mirror 50 has the characteristic of separating frequencies of visible light radiation like the visible light rays 43 from non-visible frequencies of light radiation. In the present embodiment, the cold mirror 50 transmits the single reflected, non-visible beam 22 and reflects the reflected visible light rays 43 again to a conventional viewfinder system 55, which has the elements of a viewfinder lens 56 and an eyepiece 57 to provide viewing through the taking lens.

The error magnification lens 60 is located substantially vertically above the cold mirror 50. The magnification lens 60 is any well-known type of magnifying lens and in this embodiment is a negative lens element in the form of a double concave lens. The single reflected beam 22, which has been transmitted from the cold mirror 50 passes through the magnification lens 60 and is magnified to enable the photo-sensing system 60 to detect a minor error with respect to a state of correct focus when the single non-visible beam 22 has been placed in collimated form. More specifically, when the object 23 is out of focus and the single reflected, non-visible beam 22 is refracted by the rear lens 32 in either convergent or divergent form, the magnification lens 60 will magnify the state of convergence or divergence in order to increase the ability of the photo-sensing system 70 to sense a focusing error.

The photo-sensing system 70 is located substantially vertically above the magnification lens 60. The photo-sensing system 70 senses any state of convergence or divergence of the single reflected beam 22. The photo-sensing system 70 has a pair of photo-sensitive cell elements 71 and 72, which conventionally produce an electrical signal corresponding to the amount of light received. The photocell elements 71 and 72 are adjacent each other and have a boundary which is perpendicular to the path of movement of an image formed by the transmitted beam of radiation substantially in the plane of the photocell elements 71 and 72 as the object is brought into focus. The direction and amount of movement of the focusing lens 31 of the lens system 30 is responsive to the electrical imbalance determined by the photo-sensing system 70. Suitable electrical circuitry (not shown), such as disclosed in Hendrickson and Johnston, U.S. Pat. No. 4,032,934, assigned to the same assignee, responds to the electrical signals produced by the single reflected, non-visible beam 22 impinging upon the photo-sensitive cells 71 and 72. When the single beam 22 has been refracted in collimated form by the rear lens 32, the beam 22 will impinge equally upon the photo-sensitive cell elements 71 and 72 and the electrical signals are equivalent. The electrical signals are measured by the electrical circuitry and any differential is translated to the servo system 80.

The photosensitive cells 71 and 72 are of the type which can be produced to sense only a small range of frequencies within the electromagnetic spectrum. In the present embodiment the photosensitive cells 71 and 72 are infrared light frequency sensitive and sense only frequencies of between 8,000 and 10,000 A. The photosensitive cells 71 and 72 in this particular embodiment are preferably Part # SSL55G manufactured by the General Electric Co. The light emitting diode 21 is adapted to emit only this range of frequencies. Any ambient infrared light is normally present in such insignificant quantity that it has no effect upon the photosensitive cells 71 and 72.

The servo system 80 controls the position of the focusing lens 31. When the camera 10 is in focus, the afocal lens group refracts the beam 22 is collimated form and also adjusts the direction of the visible light rays 43 to meet at points on the film plane 39. The servo system 80 has an electric motor 81 which adapts the differential in electrical signals into mechanical energy in a well-known manner. Upon energization, the motor 81 effects movement of a circular annular barrel 33 to automatically rotate the barrel 33. This rotation causes the focusing lens 31 to move along the axis 34, thereby bringing the object into focus.

Though the embodiments hereinbefore described are preferred, many modifications and refinements which do not depart from the true spirit and scope of the invention may be conceived by those skilled in the art. It is intended that all such modifications be covered by the following claims.

What is claimed is:

1. A closed loop automatic focusing system comprising:

means for producing a beam of non-visible radiation directed towards and reflected from an object;

afocal objective lens means for refracting the beam of non-visible radiation reflected from the object and visible light radiation reflected from the object, the lens means having the characteristic of refracting the reflected beams of non-visible radiation and the reflected visible light radiation in divergent or convergent form when the object is not in focus and refracting the reflected beam of non-visible radiation and reflected visible light radiation in collimated form when the object is in focus;

means for sampling the beam of non-visible radiation and visible light radiation refracted from the lens means to produce a single sampled portion;

means, acting upon the single sampled portion, for separating the reflected beam of non-visible radiation from the visible light radiation, the separation means having the characteristics of diverting the visible light radiation to a viewfinder and transmitting the beam of non-visible radiation;

sensing means in the path of the transmitted beam of non-visible radiation for sensing a condition of divergence or convergence of the transmitted beam to provide an error signal; said sensing means comprising a double photo-sensitive cell, having adjacent photocell elements whose boundary is perpendicular to the path of movement of the transmittted beam of radiation as the object is brought into focus; and servo means responsive to the error signal for adjusting the lens means to bring the object into focus.

2. The closed loop automatic focusing system in claim 1 wherein the beam of radiation emitted from the beam producing means is composed of infrared light radiation frequencies.

3. The closed loop automatic focusing system in claim 1 wherein the beam producing means radiates the beam of radiation in an angle of not more than three degrees.

4. The closed loop automatic focusing system in claim 1 wherein the beam producing means includes an emitting source which is parallax-corrected when focused.

5. The closed loop automatic focusing system in claim 1 wherein the transmitted beam of radiation is refracted by a means for magnifying any condition of divergence or convergence.

* * * * *